United States Patent
Tomizaki et al.

(10) Patent No.: US 10,753,888 B2
(45) Date of Patent: Aug. 25, 2020

(54) SYSTEM AND A METHOD FOR RESOLVING A CRYSTAL STRUCTURE OF A CRYSTAL AT ATOMIC RESOLUTION BY COLLECTING X-RAY DIFFRACTION IMAGES

(71) Applicant: PAUL SCHERRER INSTITUT, Villigen PSI (CH)

(72) Inventors: Takashi Tomizaki, Baden (CH); Soichiro Tsujino, Endingen (CH)

(73) Assignee: Paul Scherrer Institut, Villigen PSI (CH)

( * ) Notice: Subject to any disclaimer, the term of this patent is extended or adjusted under 35 U.S.C. 154(b) by 141 days.

(21) Appl. No.: 15/778,722

(22) PCT Filed: Oct. 28, 2016

(86) PCT No.: PCT/EP2016/076032
§ 371 (c)(1),
(2) Date: May 24, 2018

(87) PCT Pub. No.: WO2017/089069
PCT Pub. Date: Jun. 1, 2017

(65) Prior Publication Data
US 2018/0348149 A1 Dec. 6, 2018

(30) Foreign Application Priority Data
Nov. 24, 2015 (EP) .................................... 15195946

(51) Int. Cl.
*G01N 23/20025* (2018.01)
*G10K 15/00* (2006.01)
(Continued)

(52) U.S. Cl.
CPC ...... *G01N 23/20025* (2013.01); *B01L 3/0241* (2013.01); *B01L 3/06* (2013.01);
(Continued)

(58) Field of Classification Search
CPC ..... B01L 2200/0626; B01L 2400/0439; B01L 3/0241; B01L 3/06; G01N 2223/0566;
(Continued)

(56) References Cited

U.S. PATENT DOCUMENTS 5,036,944 A * 8/1991 Danley .................. G10K 15/00
181/0.5
7,200,493 B2 4/2007 Nilsson et al.
(Continued)

FOREIGN PATENT DOCUMENTS

CN 201886678 U 6/2011
CN 106259268 A 1/2017
(Continued)

OTHER PUBLICATIONS

Chris J.Benmore et al.: "Structural Characterization and Aging of Glassy Pharmaceuticals made Using Acoustic Levitation", Journal of Pharmaceutical Sciences, vol. 102, No. 4, Apr. 2013, pp. 1290-1300, XP055259365, Washington, US, ISSN: 0022-3549, DOI: 10.1002/jps.23464.
(Continued)

*Primary Examiner* — Marcus H Taningco
(74) *Attorney, Agent, or Firm* — Laurence Greenberg; Werner Stemer; Ralph Locher

(57) ABSTRACT

A method and a system for resolving a crystal structure of a crystal at atomic resolution by collecting X-ray diffraction images. The method includes the steps: a) ejecting a droplet of fluid comprising single or multiple of crystal into an ultrasonic acoustic levitator; b) levitating the droplet of fluid with the crystal in the ultrasonic acoustic levitator; b) monitoring the position and the spinning of the droplet with a visualization apparatus; c) applying X-ray to the crystal, the X-ray stemming from an X-ray source; and d) detecting the X-ray diffraction images from the crystal irradiated by
(Continued)

the X-ray source by an X-ray detector being capable to capture two dimensional diffraction patterns.

17 Claims, 3 Drawing Sheets

(51) Int. Cl.
  *B01L 3/02* (2006.01)
  *B01L 3/06* (2006.01)
  *G01N 23/207* (2018.01)

(52) U.S. Cl.
  CPC ........... *G01N 23/207* (2013.01); *G10K 15/00* (2013.01); *B01L 2200/0626* (2013.01); *B01L 2400/0439* (2013.01); *G01N 2223/0566* (2013.01); *G01N 2223/3306* (2013.01)

(58) Field of Classification Search
  CPC ..... G01N 2223/3306; G01N 23/20025; G01N 23/207; G10K 15/00
  See application file for complete search history.

(56) References Cited

U.S. PATENT DOCUMENTS

| | | | |
|---|---|---|---|
| 2003/0049642 A1* | 3/2003 | Nilsson | C30B 29/58 |
| | | | 435/6.16 |
| 2012/0197005 A1 | 8/2012 | Benmore et al. | |
| 2015/0191716 A1 | 7/2015 | Lipkens et al. | |

FOREIGN PATENT DOCUMENTS

| | | |
|---|---|---|
| DE | 102012101469 A1 | 8/2013 |
| WO | 02057520 A1 | 7/2002 |

OTHER PUBLICATIONS

Marco A. B. Andrade et al: "Particle manipulation by a non-resonant acoustic levitator", Applied Physics Letters, vol. 106, No. 1, p. 014101, XP055259528, 2 Huntington Quadrangle, Melville, NY 11747, ISSN: 0003-6951, DOI: 10.1063/1.4905130, (2015).

A. K. Gangopadhyay et al: "Beamline electrostatic levitator for in situ high energy x-ray diffraction studies of evitated solids and liquids", Review of Scientific Instruments vol. 76, No. 7, pp. 73901-073901, AIP, Melville, NY, US, XP012079566; ISSN: 0034-6748, DOI: 10.1063/1.1932447, (2005).

Jork Leiterer et al.: "The use of an acoustic levitator to follow crystallization in small droplets by energy-dispersive X-ray diffraction", Journal of Applied Crystallography, vol. 39. No. 5, pp. 771-773, XP055259234; ISSN: 0021-8898, DOI: 10.1107/S0021889806024915, (2006).

Soares Alexei S. et al.: "Acoustically Mounted Microcrystals Yield High-Resolution X-ray Structures"; Biochemistry, May 31, 2011; vol. 50(21); pp. 4399-4401.

Santesson Sabina et al.: "Screening of Nucleation Conditions Using Levitated Drops for Protein Crystallization"; Anal. Chem: 2003; vol. 75; pp. 1733-1740.

Tsujino Soichiro et al; "Ultrasonic acoustic levitation for fast frame rate X-ray protein crystallography at room temperature"; Scientific Reports; May 6, 2016; vol. 6; No. 25558; pp. 1-9.

* cited by examiner

SYSTEM AND A METHOD FOR RESOLVING A CRYSTAL STRUCTURE OF A CRYSTAL AT ATOMIC RESOLUTION BY COLLECTING X-RAY DIFFRACTION IMAGES

BACKGROUND OF THE INVENTION

Field of the Invention

The present invention is related to a system and a method for resolving a crystal structure of a crystal at atomic resolution by collecting X-ray diffraction images.

X-ray diffraction is one of the best-established methods for the atomic-resolution structural analysis of macromolecules such as biological crystalline specimens and synthetic molecules. Combining synchrotron light sources with 2-dimensional high frame rate pixel detectors the collection time for a complete dataset has been reduced down to a few minutes. The acquisition rates, now routinely above 10 Hz, enable a continuous rotation of the protein crystal kept at freezing temperatures. Such an X-ray diffraction experiment setup, common to all major synchrotron beam lines, has accelerated the solution of important protein molecular structures during the last decade. It has been proposed that even faster data acquisition rate of 100-1000 Hz or higher leads to the minimization of the damage of fragile protein crystals by outrunning the diffusion of radicals generated by the X-ray absorption, thus drastically improving the quality of the diffraction dataset at room temperature. A faster data acquisition rate would also make it possible to perform a range of experiments that can only be conducted at room temperature, where the protein crystals is closer to physiological condition, such as in-situ structural dynamics studies and time-resolved experiments. Room temperature experiments will not only enable rapid screening of crystals but also facilitate the investigation of the conformational diversity of biomolecules that are difficult to study with frozen specimens.

When a crystal is inside a droplet that is levitated by acoustic radiation pressure, internal circulation of the droplet due to the acoustic streaming induces fast spinning and orbiting of the crystal. Consequently, with careful alignment of the X-ray beam to the crystal, it is possible to acquire a dataset with various crystal orientations within a short time using a fast X-ray detector.

In the conventional method as well as the acoustic levitation method of collecting the X-ray diffraction dataset, however, the single crystal samples have to be harvested and delivered manually. An automated method of the sample delivery such as the direct X-ray diffraction experiments through the crystallization plates and the acoustic ejection of the crystals on a solid sample holding mechanism as well as the use of continuous stream or a droplet train of crystallization liquid containing the single crystal samples have been reported previously. However, the efficiency of the sample usage of such methods is very low because of the difficulty to measure the X-ray diffraction images of each sample at multiple crystal orientations.

SUMMARY OF THE INVENTION

The purpose of the current invention is to achieve the fast X-ray diffraction dataset acquisition at the frame rate of 100-1000 Hz or higher without the need to freeze the sample and with the high efficiency of the sample use by combining the ultrasonic acoustic levitation of droplets with an automatic sample harvest and delivery mechanism.

It is therefore the objective of the present invention to provide a system and a method for resolving a crystal structure of a crystal at atomic resolution by collecting X-ray diffraction images thereby enabling the atomic-resolution solution of crystal structure of fragile macromolecular crystals, such as proteins.

This objective is achieved with respect to the system according to the present invention by a system for resolving a crystal structure of a crystal at atomic resolution by collecting X-ray diffraction images, comprising:

a) an ultrasonic acoustic levitator that levitates at least one droplet of fluid containing a single or multiple of spinning crystals, said ultrasonic acoustic levitator comprising:
  i) one or multiple of ultrasonic transducers;
  ii) one or multiple of electrical sources that supply the driving power for the said ultrasonic transducer;
  iii) at least one X-ray window;
  iv) a mechanical shield of the ultrasonic acoustic levitator that isolates the ultrasonic transmitting medium in which the droplet is levitated from the surrounding in terms of the air and the air turbulence and the at least one X-ray window;
b) one or multiple of ejectors of one or multiple of droplets of said fluid containing said single or multiples of crystals into said ultrasonic acoustic levitator;
c) an X-ray source; and
d) an X-ray detector that detects the X-ray diffraction images from the said crystal irradiated by the said X-ray source.

With respect to the method this objective is achieved according to the present invention by a method for resolving a crystal structure of a crystal at atomic resolution by collecting X-ray diffraction images, comprising the steps of:

a) ejecting a droplet of fluid comprising one or multiple of crystals into an ultrasonic acoustic levitator;
b) levitating said droplet comprising said crystal in said ultrasonic acoustic levitator;
c) visually monitor the spatial position and spinning of said crystal in said levitating droplet;
d) applying X-ray beam to said crystal in said levitating droplet, said X-ray stemming from an X-ray source; and
e) detecting the X-ray diffraction images from said crystal irradiated by said X-ray source by an X-ray detector being capable to capture two dimensional diffraction patterns with a frame rate in the range of 100 to 3000 frames per sec or higher.

The current invention realizes fully automated X-ray diffraction experiments with high data acquisition rate and high efficiency of sample use, thereby accelerating the structural analysis of biomolecules as well as structure-based drug development.

A preferred embodiment of the present invention may comprise:

a) an ultrasonic acoustic levitator that levitates at least one droplet of a fluid containing one or multiple of spinning crystals, said ultrasonic acoustic levitator comprising:
  i) a first ultrasonic transducer;
  ii) an ultrasonic reflector;
  iii) a second ultrasonic transducer to monitor a pressure of the acoustic standing wave in the acoustic cavity between said first ultrasonic transducer and said ultrasonic reflector;
  iv) an electrical source that supplies the driving power for the first ultrasonic transducer for a stable ultrasonic pressure output;
  v) at least one X-ray window;

vi) a mechanical shield of the ultrasonic acoustic levitator that isolates the ultrasonic transmitting medium in which the droplet is levitated from the surrounding in terms of the air and the air turbulence and the at least one X-ray window;

vii) an adjustment mechanism of the gap, the parallelism, and the displacement between said first ultrasonic transducer and the said ultrasonic reflector; and b) an ejector of a droplet of said fluid containing said single or multiples of crystals into said ultrasonic acoustic levitator;

c) an apparatus for visualization of the position and the spinning of the said crystal in the said levitated droplet;

d) an X-ray source;

e) an X-ray detector that detects the X-ray diffraction images from the said crystal irradiated by said X-ray source;

f) a beam stop that stops the incident X-ray beam between the said crystal and said X-ray detector; and g) an apparatus for controlling the humidity and the temperature of the ultrasonic transmitting medium in which the said droplets are levitated.

An additional measure could be to adjust the solvent content in the crystal by controllably evaporating the droplet fluid while levitating the droplet by way of controlling the humidity.

Additionally or alternatively, the molecular conformation of the crystal can be varied by controlling the temperature of the droplet, the chemical consistency or pH of the solvent by ejecting additional droplets into the levitating droplets in the ultrasonic levitator.

A further preferred embodiment of the present invention may provide the step of varying the molecular conformation of the crystal by applying optical pulses or laser pulses with specific wavelength to the droplet.

The crystal used in the method and in the system in order to determine its crystal structure can be selected from a non-exclusive group comprising proteins, biomolecular crystals, macro-molecular crystals and the like.

BRIEF DESCRIPTION OF THE SEVERAL VIEWS OF THE DRAWING

Preferred embodiments of the present invention are hereinafter described in more detail with respect to the attached drawings which depict in.

DESCRIPTION OF THE INVENTION

Figure 1:
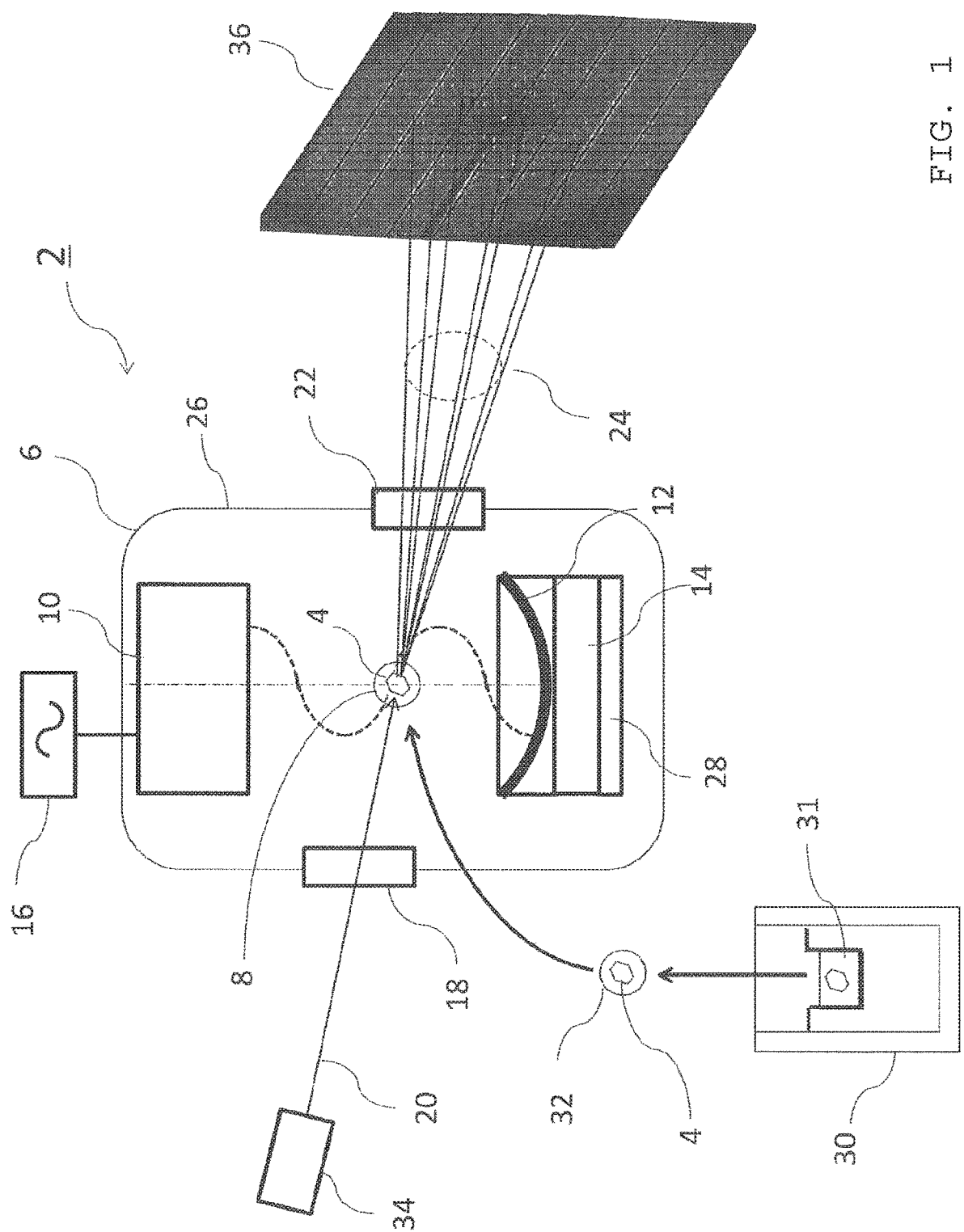
FIG. 1 schematically a graphical representation of X-ray diffraction imaging system for resolving the crystal structure of a crystal.
Figure 2:
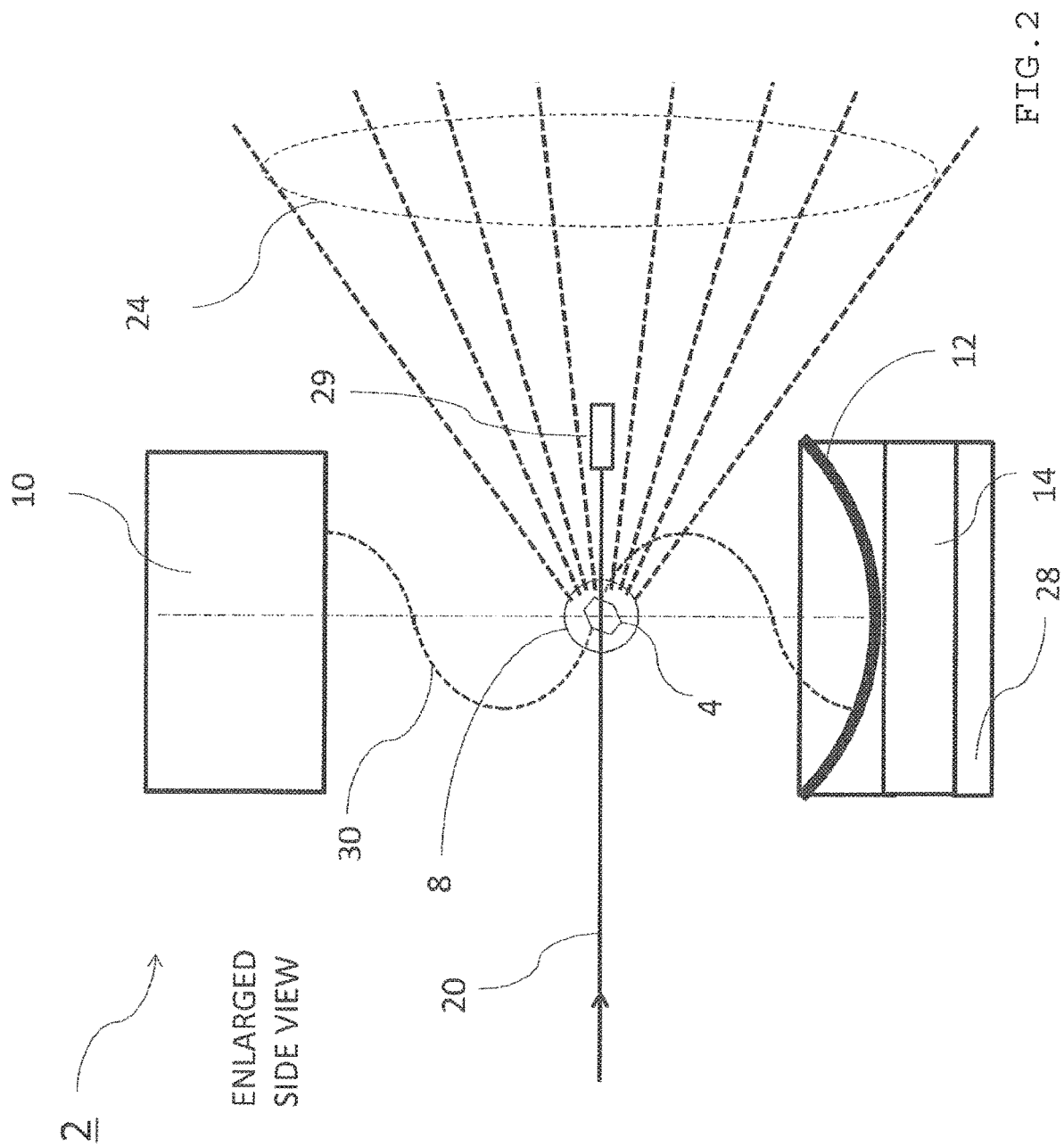
FIG. 2 schematically an alternative system as compared to the system shown in FIG. 1.
Figure 3:
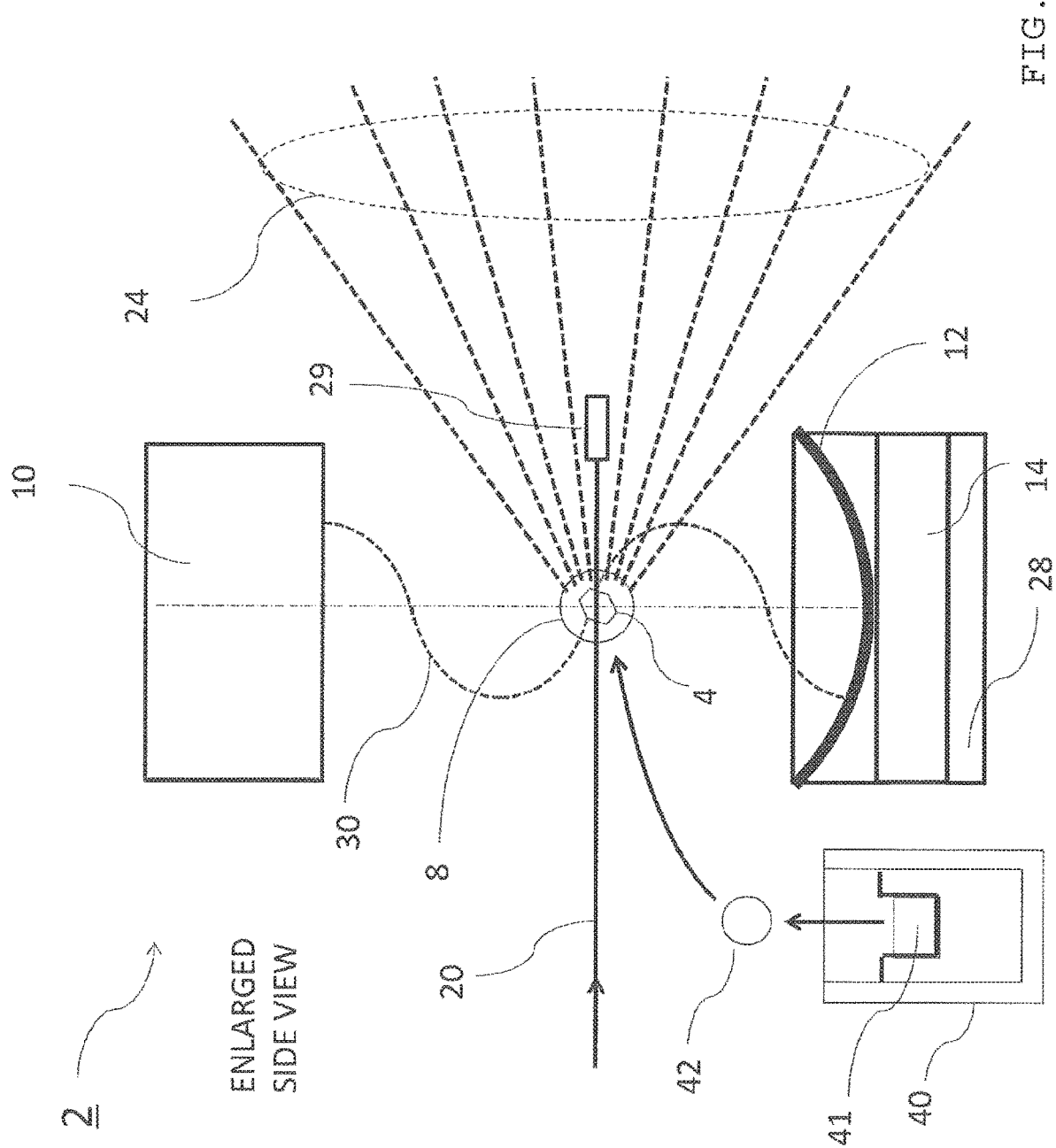
FIG. 3 schematically a further alternative system as compared to the systems shown in FIGS. 1 and 2.

FIGS. 1 to 3 shows a system 2 for resolving the crystal structure of a crystal 4 at atomic resolution by collecting X-ray diffraction images. The system 2 comprises an ultrasonic acoustic levitator 6 that levitates at least one droplet 8 of fluid containing one or multiple of spinning crystals 4. In one embodiment of the present invention, said ultrasonic acoustic levitator 6 comprises an ultrasonic transducer 10 for generating the ultrasonic acoustic wave and an ultrasonic reflector 12 and an ultrasonic transducer 14 to monitor the acoustic levitating pressure. Further, the ultrasonic acoustic levitator 6 comprises an electrical source 16 that drives the driving power of the said ultrasonic transducer 10 to generate a stable constant pressure output by way of varying the driving frequency and voltage output by using the driving current as the feedback signal. Furthermore, the ultrasonic acoustic levitator 6 comprises a first X-ray window 18 for an incident X-ray beam 20 and a second X-ray window 22 for the diffracted X-ray beam 24. A mechanical shield 26 of the ultrasonic acoustic levitator 6 is provided to isolate the ultrasonic transmitting medium in the said ultrasonic acoustic levitator 6 and the said levitating droplet 8 from the air and the air turbulence in the surrounding. Further, an adjustment mechanism 28 is provided to adjust a gap, the parallelism and the displacement between said ultrasonic transducer 10 and the said ultrasonic reflector 12.

The system 2 further comprises an ejector 30 for the ejection of one or multiple of droplets 32 of the said fluid 31 containing said single or multiples of crystals 4 into the said ultrasonic acoustic levitator 6. An apparatus for the visualization of the position and the spinning of the said crystal 4 in the levitating droplet 8 is provided as well as an X-ray source 34 and an X-ray detector 36 that detects the X-ray diffraction images 24 from the said single crystal 4 irradiated by the said X-ray source 34. A beam stop 29 stops the incident X-ray beam 20 between the said crystal 4 and the said X-ray detector.

The acoustically levitated droplet 8 contains one or multiple of protein crystals 4 to be analysed by the X-ray diffraction. The high frame rate 2-dimensional detector 36 captures the diffracted X-ray 24. The condition of the acoustic levitator 6 is chosen such that the crystal orientation is rapidly varied via the internal circulation of the liquid droplet 8 by typically setting the acoustic levitating pressure in the range of 1 to 3 kPa. The droplet 8 containing single protein crystals 4 is placed in the levitator 6 via the droplet ejector 30 that can be automatically controlled.

Further additional one or multiple of droplet ejectors 40 ejects one or multiple of droplets 42 of fluid 41 with certain chemical consistency into the levitating droplet 8 in the ultrasonic acoustic levitator 6.

The purpose of the system 2 is to achieve the collection of X-ray diffraction dataset from single crystals 4 with the data acquisition rate of sub kHz to kHz or higher without freezing the sample and at increased maximum radiation dose. Another purpose of the system is to realize a fast X-ray protein structural analysis with a fully automated chain of the tasks from the harvesting of the protein crystals, their delivery to the X-ray beam path, and the acquisition of the dataset of X-ray diffraction images for solving the crystal structure at Angstrom resolution.

The system 2 comprises the acoustic levitator 6, the two-dimensional X-ray detector 36, the X-ray source 34, and the ejector 30 of liquid droplets 8 containing single protein crystals 4. The acoustic levitator 6 comprises the ultrasonic transducer 10 of which output is stabilized by feedback the ultrasonic mirror reflector 12, and a transducer 14 to monitor the ultrasonic acoustic levitation pressure of the levitator 6. The ultrasonic mirror reflector 12 can be the levitator pressure sensor as well by attaching said transducer 14 to said mirror reflector 12. The two-dimensional X-ray detector 36 is capable to capture a series of X-ray images at high repetition rate of sub-kHz to kHz or higher with a minimal inactive time between the frames.

In one embodiment of the acoustic levitator 6, a standing wave acoustic pressure distribution 30 is established between the said transducer 10 and said reflector 12. When the peak pressure amplitude is of a sufficient amount, liquid droplets 8 can be levitated at a position close to any pressure nodes with small drift amplitude in both vertical and horizontal direction. Of particular importance is to adjust the levitation acoustic pressure to realize a stable levitation condition as well as fast spinning and/or orbiting of the protein crystal 4 inside the levitated droplet 8 via the internal circulation of the levitated droplet 8 by the acoustic streaming. This can be realized for example by adjusting the acoustic pressure lower than the pressure that can atomizes the droplet 8 but sufficiently (e.g. 40-60%) larger than the pressure threshold below which value the levitation cannot be maintained due to the gravity by in the case of the embodiment of the levitator comprising the acoustic reflector 12 by adjusting the gap between said transducer 10 and said reflector 12.

The ejector 30 may use an acoustic ejection using one or multiple of concentrated high frequency ultrasonic pulses into a crystallization tray or an acoustic ejection from a crystallization capillary by way of an application of pulsed acoustic pressure to the capillary.

The invention claimed is:

1. A system for resolving a crystal structure of a crystal at atomic resolution, the system comprising:
    a) an ultrasonic acoustic levitator configured to levitate at least one droplet of fluid containing one or a plurality of spinning crystals, said ultrasonic acoustic levitator including:
        i) one or a plurality of ultrasonic transducers configured to generate ultrasonic acoustic waves;
        ii) one or a plurality of electrical sources for supplying a driving power for said ultrasonic transducer;
        iii) a mechanical shield disposed to insulate an ultrasonic transmitting medium of said ultrasonic acoustic levitator and the levitating droplet therein from air and air turbulence in a surrounding environment; and
        iv) at least one X-ray window;
    b) one or a plurality of droplet ejectors for ejecting one or a plurality of the droplets of the fluid containing the crystal or crystals into said ultrasonic acoustic levitator;
    c) an X-ray source for generating an X-ray beam;
    d) an X-ray detector disposed to detect X-ray diffraction images scattered by the crystal upon irradiation by the X-ray beam;
    e) a beam stop disposed to stop an incident X-ray beam between the crystal and said X-ray detector; and
    f) an apparatus for aligning a position of the crystal in the levitating droplet in said ultrasonic levitator with respect to the X-ray beam to enable the X-ray diffraction images at said X-ray detector to indicate the crystal structure of the crystal at atomic resolution.

2. The system according to claim 1, which comprises a further ultrasonic transducer for monitoring an acoustic levitation pressure.

3. The system according to claim 1, which comprises an apparatus configured to control a temperature and a humidity of the ultrasonic transmitting medium in the said ultrasonic acoustic levitator.

4. The system according to claim 1, wherein said electrical source is configured to drive said ultrasonic transducer to generate a stable ultrasonic acoustic pressure output by way of varying a driving frequency and voltage output by using a driving current as a feedback signal.

5. The system according to claim 1, wherein a levitation force of the droplet is provided by an acoustic standing wave in an acoustic cavity formed by said ultrasonic acoustic transducer and an acoustic mirror reflector.

6. The system according to claim 5, wherein said ultrasonic transducer is in mechanical contact with said acoustic mirror reflector.

7. The system according to claim 5, which comprises an adjustment mechanism for adjusting a gap, a parallelism, and a displacement between said ultrasonic transducer and said acoustic mirror reflector.

8. The system according to claim 1, wherein additional one or multiple said droplet ejectors eject one or a plurality of droplets of fluid to said levitating droplet in said ultrasonic acoustic levitator.

9. The system according to claim 1, which comprises an apparatus for visualizing the crystal in the levitating droplet and for monitoring the position and a spinning of the crystal.

10. The system according to claim 1, wherein said X-ray detector is configured to capture two-dimensional diffraction patterns with a frame rate in a range of 100 to more than 3000 frames per second.

11. A method for resolving a crystal structure of a crystal at atomic resolution, the method comprising:
    a) ejecting a droplet of fluid by a droplet ejector into an ultrasound levitator, the droplet containing one or a plurality of crystals;
    b) levitating the droplet with the crystal in an ultrasonic acoustic levitator;
    c) generating an X-ray beam with an X-ray source and subjecting the crystal to the X-ray beam; and
    d) detecting an X-ray diffraction by an X-ray detector, the X-ray diffraction being generated by a scattering from said single crystal irradiated by the X-ray beam and indicating the crystal structure of the crystal in the droplet at atomic resolution.

12. The method according to claim 11, which comprises maintaining an ultrasonic acoustic pressure within the ultrasonic acoustic levitator within a range from 1 to 4 kPa.

13. The method according to claim 11, which comprises adjusting a solvent content in the crystal and/or a molecular conformation of the crystal by varying a chemical consistency or pH of the levitating droplet fluid by ejecting one or a plurality of droplets of fluid by one or a plurality of additional droplet ejectors into the levitating droplet in the ultrasonic levitator.

14. The method according to claim 11, which comprises adjusting a solvent content in the crystal and/or a molecular conformation of the crystal by controllably evaporating a solvent while levitating the droplet by way of controlling a humidity and/or by controlling a temperature of the droplet.

15. The method according to claim 11, which comprises varying a molecular structure of the crystal by ornamenting the crystal with a ligand by ejecting one or a plurality of additional droplets of fluids containing the ligand into the levitating droplet in the ultrasonic levitator.

16. The method according to claim 11, which comprises varying a molecular conformation of the crystal by subjecting the crystal to optical radiation of broadband wavelength or with specific wavelength or magnetic pulses.

17. The method according to claim 11, which comprises capturing with the X-ray detector two-dimensional diffraction patterns with a frame rate in a range of 100 to more than 3000 frames per second.

* * * * *